US012115953B2

(12) United States Patent
Li

(10) Patent No.: US 12,115,953 B2
(45) Date of Patent: Oct. 15, 2024

(54) HIGH-PRESSURE THERMAL FLUID BRAKE AND ENGINE ENERGY RECOVERY SYSTEM

(71) Applicant: Cheng Li, Burnaby (CA)

(72) Inventor: Cheng Li, Burnaby (CA)

( * ) Notice: Subject to any disclaimer, the term of this patent is extended or adjusted under 35 U.S.C. 154(b) by 0 days.

(21) Appl. No.: 17/919,168

(22) PCT Filed: Mar. 15, 2021

(86) PCT No.: PCT/CN2021/080778
§ 371 (c)(1),
(2) Date: Oct. 14, 2022

(87) PCT Pub. No.: WO2021/208653
PCT Pub. Date: Oct. 21, 2021

(65) Prior Publication Data
US 2023/0159007 A1    May 25, 2023

(30) Foreign Application Priority Data
Apr. 16, 2020  (CN) ......................... 202010299364.X

(51) Int. Cl.
*B60T 1/10*    (2006.01)
*F02B 63/06*    (2006.01)
(Continued)

(52) U.S. Cl.
CPC ................ *B60T 1/10* (2013.01); *F02B 63/06* (2013.01); *F02G 5/00* (2013.01); *F25B 27/02* (2013.01)

(58) Field of Classification Search
CPC ......... Y02E 60/16; Y02E 60/14; Y02E 70/30; Y02E 10/46; Y02B 10/70; Y02B 30/52;
(Continued)

(56) References Cited

U.S. PATENT DOCUMENTS 4,535,861 A * 8/1985 Nagy .................... B60L 7/10
191/1 R
5,549,174 A   8/1996 Reis
(Continued)

FOREIGN PATENT DOCUMENTS

CN    101016890 A    8/2007
CN    102069788 A    5/2011
(Continued)

OTHER PUBLICATIONS

International Search Report, dated May 6, 2021, for International Patent Application No. PCT/CN2021/080778. (2 pages).

*Primary Examiner* — George C Jin
*Assistant Examiner* — Teuta B Holbrook
(74) *Attorney, Agent, or Firm* — Seed IP Law Group LLP

(57) ABSTRACT

A High Pressure Thermal Fluid Brake and Engine Energy Recovery System is provided, comprising a plurality of interconnected energy collection system and energy storage system, and a control unit connected with the energy collection system and the energy storage system. The control unit is connected with the vehicle controller to at least read and collect acceleration pedal position information, brake pedal position information, vehicle travel parameters and cooling system parameters of the vehicle. The energy collection system recovers vehicle kinetic energy, engine mechanical energy and engine thermal energy and stores the recovered energy in the energy storage system. The control unit controls the energy recovery and release of the energy collection system and the energy storage system according to the vehicle information read and collected. This system can effectively recover vehicle braking energy, engine idle energy and engine heat energy and reuse, reduce the energy waste of motor vehicle system to achieve the purpose of energy saving, fuel saving and emission reduction.

9 Claims, 6 Drawing Sheets

(51) Int. Cl.
*F02G 5/00* (2006.01)
*F25B 27/02* (2006.01)

(58) Field of Classification Search
CPC . Y02T 10/12; Y02T 10/88; B60T 1/10; B60T 1/00; B60T 10/00; B60T 17/00; B60T 17/002; B60T 17/02; B60T 17/04; B60T 2250/04; B60T 2260/00; B60T 2260/08; F02G 5/00; F02G 5/02; F02B 27/00; F02B 27/02; F02B 27/0294; F02B 27/0205; F01B 23/10; F01B 17/022; F01B 17/027

See application file for complete search history.

(56) References Cited

U.S. PATENT DOCUMENTS

| | | | |
|---|---|---|---|
| 10,012,448 B2 * | 7/2018 | Laughlin | F28D 15/00 |
| 10,208,666 B2 * | 2/2019 | Merswolke | F28D 20/00 |
| 2011/0127004 A1 * | 6/2011 | Freund | F02C 6/16 |
| | | | 165/45 |
| 2013/0333380 A1 | 12/2013 | Kardos et al. | |
| 2019/0226735 A1 * | 7/2019 | Bissell | F25B 47/025 |

FOREIGN PATENT DOCUMENTS

| | | | | |
|---|---|---|---|---|
| CN | 103442960 A | | 12/2013 | |
| CN | 106257158 A | | 12/2016 | |
| CN | 108661765 A | * | 10/2018 | F01N 5/025 |
| CN | 111469816 A | | 7/2020 | |
| DE | 102010014834 A1 | * | 6/2011 | F01C 1/22 |
| DE | 102016213763 A1 | | 2/2018 | |
| EP | 0645272 A1 | | 3/1995 | |
| JP | 2019180143 A | * | 10/2019 | |
| TW | 384934 U | * | 7/2010 | |

* cited by examiner

HIGH-PRESSURE THERMAL FLUID BRAKE AND ENGINE ENERGY RECOVERY SYSTEM

BACKGROUND

Technical Field

This disclosure relates to the technical field of vehicle energy recovery, in particular to a High Pressure Thermal Fluid Brake and Engine Energy Recovery System.

Description of the Related Art

Petroleum is non-renewable energy, and they are polluting when used, and they also produce greenhouse gases. In order to reduce the consumption of Petroleum and reduce greenhouse gas emissions, we must increase the total vehicle energy efficiency by controlling vehicle energy waste, and recovering the brake energy. Whether electric cars are "green energy vehicles" in the new era depends on where the electricity comes from. Coal, Petroleum, Natural gas and nuclear power plants are not clean energy.

The automobile industry has encountered a strong push for all-electric, but the energy density of traditional gasoline is 13 times that of the most advanced lithium batteries, which means that the output of the same energy is small and light in weight (The fuel weight of the same energy is 1/50 of the battery). The energy efficiency of the power system is much higher than that of a traditional internal combustion engine, but the overall comparison is still lighter and more practical than traditional gasoline or diesel vehicle.

At present, the average energy efficiency of fuel vehicles is 40% to 45%(the energy efficiency of pure electric vehicles is 90%). If the efficiency of the whole vehicle can be improved to 70%, it will achieve an environmental protection effect that even electric vehicles cannot surpass; however, the actual efficiency of various vehicle energy recovery systems is currently less than 50%. Currently, the commonly used vehicle energy recovery systems include high-pressure gas or hydraulic recovery systems, and hybrid recovery power systems, all of which have shortcomings.

High pressure gas recovery system: waste of compressor thermal energy, waste of engine thermal energy, low recovery efficiency.

High pressure hydraulic recovery system: need to be equipped with hydraulic system, the use is limited, the recovery efficiency is low.

Hybrid/all-electric recovery system: brake recovery is limited by the motor capability, and still needs to use the traditional brake system, especially in high-speed emergency braking.

BRIEF SUMMARY

Embodiments of the present invention provide a High Pressure Thermal Fluid Brake and Engine Energy Recovery System to address problems existing in the prior art.

According to embodiments of the present invention, the High Pressure Thermal Fluid Brake and Engine Energy Recovery System includes one or more interconnected energy collection system and energy storage system, and a control unit connected to the energy collection system and the energy storage system. The control unit is connected with the vehicle controller to at least read and collect acceleration pedal position information, brake pedal position information, vehicle travel parameters and cooling system parameters of the vehicle. The energy collection system recovers vehicle kinetic energy, engine mechanical energy and engine thermal energy and stores the recovered energy in the energy storage system. The control unit controls the energy recovery and release of the energy collection system and the energy storage system according to the vehicle information read and collected.

The High Pressure Thermal Fluid Brake and Engine Energy Recovery System effectively recovers vehicle braking energy, engine idle energy and engine heat energy by setting energy collection system (ECS) and the energy storage system (ESS) on the vehicle, and controlling the recovery and release of energy through control unit, so as to achieve the purpose of reducing energy waste of motor vehicle system, saving energy, fuel and reducing emissions. At the same time, the recovered energy can provide power for the vehicle through purposeful release, provide air intake boost for the internal combustion engine through supercharge or turbocharger, heating for the vehicle cabin, and charge the battery for hybrid vehicle and all electric vehicle.

Specifically, the energy collection system includes an air compressor/engine with a heat exchanger, and the air compressor is respectively provided with solenoid on/off valve, first temperature sensor and first pressure sensor.

The air compressor with a heat exchanger is used to recover the kinetic energy of the vehicle and to provide braking for the vehicle. The solenoid on/off valve is used to activate the air compressor. The first temperature sensor and the first pressure sensor are respectively used to monitor the temperature, pressure and other working status of the air compressor.

The energy storage system includes a high pressure gas storage tank and a thermal storage tank. The high pressure gas storage tank is connected to the air compressor through a pipe and a few check valves and controllable regulators. The thermal storage tank is connected to the air compressor heat exchanger through a circulating pipeline and a pump. The second temperature sensor and the second pressure sensor are installed on the high pressure gas storage tank, and the third temperature sensor, the third pressure sensor, and a liquid level sensor are installed on the thermal storage tank.

The high pressure gas storage tank is used for storing the compressed high pressure gas, and when the system is reversed, the working pressure of the air compressor is controlled by the Controllable regulator; the thermal storage tank is used for storing the hydrothermal liquid, and the circulation pump is capable of circulating the hydrothermal liquid and heat exchange with the air compressor; the second temperature sensor and the second pressure sensor respectively monitor the working temperature and pressure of the high pressure gas storage tank. The third temperature sensor, the third pressure sensor and the liquid level sensor monitor the working temperature, pressure and liquid level of the thermal storage tank, respectively.

The air compressor is also connected with an solenoid three-way valve, and the engine or battery radiator is also connected through the solenoid three-way valve; the connection between the engine or battery radiator and the energy collection system is controlled by the solenoid three-way valve, the hydrothermal fluid is introduced to absorb the engine heat energy when the vehicle engine needs heat dissipation, and the path is closed when the engine does not need heat dissipation.

The solenoid on/off valve, the first temperature sensor, the first pressure sensor, the controllable regulator, the second temperature sensor, the second pressure sensor, the third temperature sensor, the third pressure sensor, the liquid level sensor, and the solenoid three-way valve is connected and or controlled by the control unit.

The control unit will also be connected with the vehicle controller to read the acceleration pedal position information, brake pedal position information, vehicle driving speed, engine temperature, coolant temperature and other information. In conjunction of liquid level information, temperature sensor information and pressure sensor information the control unit adjusts the pressure of the regulators, opens and closes of the circulation pump, and switches the flow direction of the solenoid three-way valve.

A specific process is: When the control unit reads the vehicle travel parameters and cooling system parameters from the vehicle central controller, and when the brake pedal is activated, the solenoid on/off valve is closed, the air compressor is activated, and the pedal position information is read; the pressure setting of the Controllable regulator is adjusted according to calculation (controller calculation), and through the different pressures to be overcome by the air compressor, different braking forces are provided for the vehicle and vehicle kinetic energy is collected. When the throttle pedal is activated, the system reverses and adjusts the pressure setting of the controllable regulator according to the pedal position information, and the air compressor also reverses operation to provide pressure to the air engine to provide power to propel the vehicle. In the process of energy collection, the heat generated by the air compressor will be absorbed by the hydrothermal liquid driven by the liquid pump and stored in the thermal storage tank; in the reverse process, the hydrothermal liquid is returned to the air compressor by the pump to release heat energy, providing energy (thermal energy) to boost the high-pressure gas in the air engine.

Further, the air compressor is also provided with a bypass, and the solenoid on/off valve controls the opening and closing of the air inlet and/or the bypass of the air compressor. The air compressor can be bypassed when it is not required to work.

Further, an exhaust pipe is arranged on the high pressure gas storage tank, and an overpressure safety protection valve is arranged on the exhaust pipe. When the pressure of the high pressure gas storage tank exceeds the set pressure value of the safety protection valve, the overpressure safety protection valve automatically opens, and after the gas with excessive pressure is discharged through the exhaust pipe, the overpressure safety protection valve will be automatically closed to ensure the safety of the high pressure gas storage tank.

Further, the air compressor is connected with an air filter. The air filter filters impurities and dust for the air compressor to ensure the normal operation of the air compressor.

Further, the heat exchanger of the air compressor connects the coolant outlet of the engine (the heat source of the engine cooling system) and the radiator inlet from the engine (the inlet of the engine cooling system) respectively through the solenoid three-way valve. The solenoid three-way valve was controlled to recover the engine heat energy according to the need.

Further, when recovering the kinetic energy of the vehicle, the energy collection system is connected to the wheel, transmission shaft or transmission of the vehicle; the energy storage system is installed on the vehicle and linked with the energy collection system; the heat of the compressed high pressure gas is extracted from the gas and the air compressor, and the separated heat energy is stored in the thermal storage tank, and the high pressure air of the separated heat energy is stored in the high pressure gas storage tank. When the brake pedal is pressed, the control system controls the braking force by collecting vehicle travel data to adjust the pressure of the regulator connected to the air compressor.

When the mechanical energy of the engine is recovered, the energy collection system is directly connected to the engine of the vehicle through a belt or two-stage clutch; and the air compressor is activated when the vehicle is idle and the energy is recovered and stored in the energy storage system.

When the engine heat energy is recovered, the energy collection system and energy storage system are directly connected to the engine hot end of the vehicle cooling system; the engine heat energy is absorbed through the heat exchanger and stored in the thermal storage tank.

Further, at least one energy recovery method is as follows: the energy collection system separates the heat of the compressed high pressure gas from the air compressor. The compressed air is stored in the high pressure gas storage tank in the energy storage system, and the extracted heat is stored in the thermal storage tank in the energy storage system. The acceleration pedal position information, brake pedal position information, vehicle travel parameters and cooling system parameters of the vehicle are fed back to the control unit, and the control unit will adjusts the pressure setting of the Controllable regulator on the air compressor, the pump connected to the thermal storage tank according to the need of energy recovery or propulsion.

Further, the energy collection system is connected to each of the vehicle axles; multiple energy collection systems are connected to one energy storage system.

Further, the utilization mode of the energy stored through the energy collection system and energy storage system includes at least the following ways: when providing heating to the cabin by connecting the thermal storage system to the cabin heat exchanger; providing high pressure air to air suspension and air brakes by connecting the high pressure gas storage tank to vehicle air tanks through a regulator; providing high pressure air to supercharger or turbocharger by connecting the high pressure gas storage tank to engine air intake through a regulator; providing charging power to electric vehicle battery by connecting high pressure gas storage tank and thermal storage system to a generator through an air motor.

The High Pressure Thermal Fluid Brake and Engine Energy Recovery System has high energy recovery efficiency with minimum energy loss. When propulsion is needed, the reversed system has the same high efficiency. This system can even substitute the current brake system (friction brake). With the ability to recover engine mechanical energy and waste heat energy, this system can increase the vehicle's total energy efficiency by 25% to 30%. Considering the normal vehicle energy efficiency is between 40 to 45%, implementing this system will cut down fuel consumption and emission greatly.

Compared with the prior art, the beneficial effects of embodiments of the invention include: 1. The High Pressure Thermal Fluid Brake and Engine Energy Recovery System effectively recovers vehicle braking energy, engine idle energy and engine heat energy by installing energy collection system (ECS) and the energy storage system (ESS) on the vehicle, and controlling the recovery and release of energy through control unit, so as to achieve the purpose of reducing energy waste of motor vehicle system, saving energy, fuel and reducing emissions; 2. The recovered energy can provide propulsion to the vehicle, provide air intake boost for the internal combustion engine through supercharge or turbocharger, provide heat to the vehicle cabin, provide propulsion to trailer with better handling, and charge the hybrid vehicle and all electric vehicle battery; 3. This system can directly replace the current brake system (brake pad friction braking); and 4. After using this system, the energy efficiency can be improved by 25% to 30%.

DETAILED DESCRIPTION

Aspects of embodiments of the invention will be clearly and completely described below in combination with the drawings. It is clear that the described embodiments are only some of the embodiments of the present invention but not all of them. Based on the embodiments of the invention, all other embodiments obtained by ordinary technicians in the field without creative working conditions fall within the scope of the protection of the invention.

In the description of the present invention, it should be noted that the azimuth or position relations indicated by the terms "middle," "upper," "lower," "inner" and "outer" are based on the azimuth or position relationship shown in the attached drawings, it is only for the purpose of describing the present invention and simplifying the description, rather than indicating or implying that the device or element referred to must have a specific orientation and be constructed and operated in a specific orientation. Therefore, it cannot be understood as a limitation to the present invention. In addition, the terms "first" and "second" are used only for descriptive purposes and cannot be understood to indicate or imply relative importance.

Embodiment 1

Figure 1:
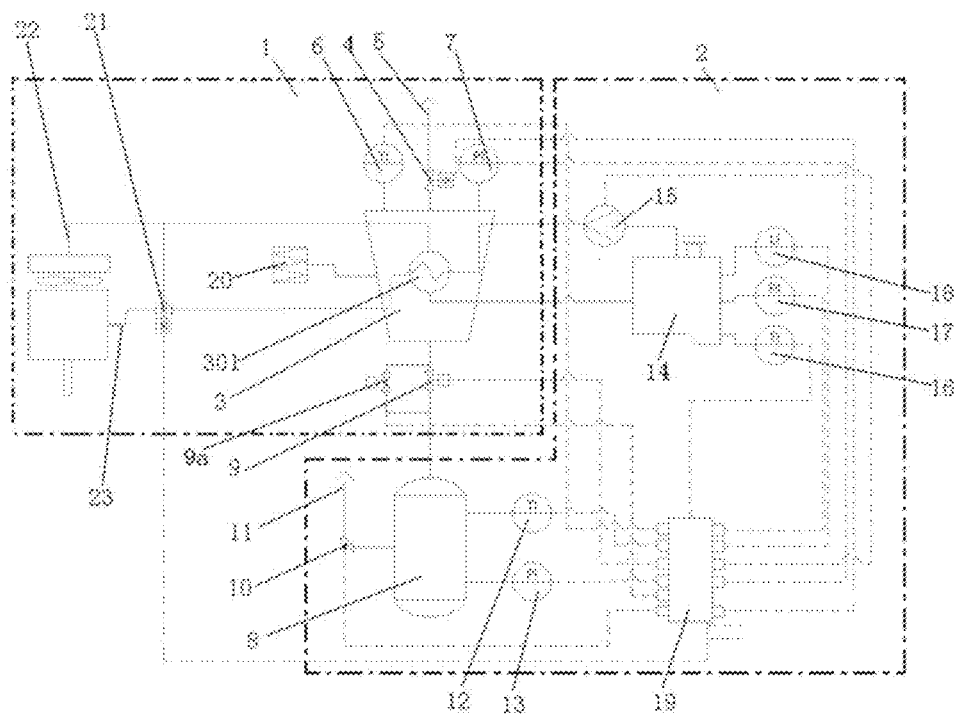
FIG. 1 is the schematic diagram of the High Pressure Thermal Fluid Brake and Engine Energy Recovery System.

As shown in FIG. 1, a High Pressure Thermal Fluid Brake and Engine Energy Recovery System according to one embodiment includes interconnected energy collection systems 1 and energy storage system 2, and a control unit 19 connected to the energy collection system 1 and the energy storage system 2. The control unit 19 is connected to a vehicle controller and at least reads and collects acceleration pedal position information, brake pedal position information, vehicle travel parameters and cooling system parameters of the vehicle. The energy collection system 1 recovers vehicle kinetic energy, engine mechanical energy and engine thermal energy and stores the recovered energy in the energy storage system 2, and the control unit 19 controls the energy recovery and release of the energy collection system 1 and the energy storage system 2 according to the vehicle information read and collected.

The High Pressure Thermal Fluid Brake and Engine Energy Recovery System effectively recovers vehicle braking energy, engine idle energy and engine heat energy by setting energy collection system (ECS) and the energy storage system (ESS) on the vehicle, and controlling the recovery and release of energy through the control unit, so as to achieve the purpose of reducing energy waste of the motor vehicle system, saving energy, lowering fuel consumption and reducing emissions. At the same time, the recovered energy can provide power to the vehicle through purposeful release, provide air intake boost for the internal combustion engine through supercharge or turbocharger, heat the vehicle cabin, and charge the hybrid vehicle and all electric vehicle battery.

Specifically, the energy collection system 1 includes an air compressor 3 with a heat exchanger 301, and the air compressor 3 is respectively provided with solenoid on/off valve 4, first temperature sensor 6 and first pressure sensor 7.

The air compressor 3 with a heat exchanger is used to recover the kinetic energy of the vehicle and to provide braking for the vehicle, the solenoid valve 4 is used to activate the air compressor 3, and the first temperature sensor 6 and the first pressure sensor 7 are respectively used to monitor the temperature, pressure and other working conditions of the air compressor 3.

The energy storage system 2 comprises a high pressure gas storage tank 8 and a thermal storage tank 14. The high pressure gas storage tank 8 is connected with the air compressor 3 through a pipe and is provided with a first controllable regulator 9 and a second controllable regulator 9a in the opposite control direction. The thermal storage tank 14 is connected with the heat exchanger 301 of the air compressor 3 through a circulation pipe and is provided with a pump 15 on the circulation pipe. The high pressure gas storage tank 8 is respectively provided with second temperature sensor 12 and second pressure sensor 13, and the thermal storage tank 14 is provided with third temperature sensor 16, third pressure sensor 17 and liquid level sensor 18.

Wherein, when the air compressor 3 supplies gas to the high pressure gas storage tank 8, the first controllable regulator 9 is used (i.e., the system is turning forward, at this time the second controllable regulator 9a is closed); when the high pressure gas storage tank 8 delivers gas to the air compressor 3 or to the vehicle, the second controllable regulator 9a is used (i.e., the system is reversed, and the first controllable regulator 9 is closed).

The high pressure gas storage tank 8 is used for storing the compressed high pressure gas, and when the system is reversed, the working pressure of the air compressor 3 is controlled by a second controllable regulator 9a; the thermal storage tank 14 is used for storing the thermal energy absorbing liquid (hydrothermal liquid), and the pump 15 is capable of circulating the thermal energy absorbing liquid to exchange heat with the air compressor 3. The second temperature sensor 12 and the second pressure sensor 13 monitor the working temperature and pressure of the high pressure gas storage tank 8 respectively; the third temperature sensor 16, the third pressure sensor 17 and the liquid level sensor 18 monitor the working temperature, pressure and liquid level of the thermal storage tank 14, respectively.

The solenoid on/off valve 4, the first temperature sensor 6, the first pressure sensor 7, the first Controllable regulator 9, the second Controllable regulator 9a, the second temperature sensor 12, the second pressure sensor 13, the third temperature sensor 16, the third pressure sensor 17 and the liquid level sensor 18 are respectively connected with the control unit 19.

The control unit 19 is also connected with a vehicle controller to read the acceleration pedal position information, brake pedal position information, vehicle driving speed, engine temperature, coolant temperature and other information, and combine these temperature sensors, pressure sensors and real-time data such as temperature and pressure feedback from liquid level sensor to adjust the pressure setting of the first/second Controllable regulator and control the opening and closing of the pump 15. The control unit 19 is an electronic control unit or chip.

One specific control process is that when the control unit 19 reads the vehicle travel parameters and cooling system parameters from the vehicle controller, and when the brake pedal is activated, close the solenoid valve 4, activate the air compressor 3, and read the pedal position information. According to the calculation (chip calculation), the pressure setting of the first controllable regulator 9 is adjusted to provide different braking forces for the vehicle and collect the kinetic energy of the vehicle through the different pressures to be overcome by the air compressor 3. When the throttle pedal is activated, the system reverses and adjusts the pressure setting of the second controllable regulator 9a according to the pedal position information, and the air compressor 3 also reverses the operation to provide pressure to the air engine to provide propulsion for the vehicle; in the process of energy collection, the heat generated by the air compressor 3 is absorbed by the hydrothermal fluid driven by the pump 15 and stored in the thermal storage tank 14. In the reverse process, the hydrothermal fluid is returned to the air compressor 3 by the pump 15 to release heat energy to provide energy to the compressed air which runs the air engine.

Further, the air compressor 3 is also provided with an exhaust pipe 5, and the solenoid on/off valve 4 controls the opening and closing of the air inlet and/or the exhaust pipe 5 of the air compressor. The exhaust tube 5 can be bypassed for the air compressor 3 when it is not required to work.

Further, the high pressure gas storage tank 8 is provided with an exhaust pipe 11, and the exhaust pipe 11 is provided with an overpressure safety protection valve 10. When the pressure of the high pressure gas storage tank 8 exceeds the set value of the overpressure safety protection valve 10 installed on it, the overpressure safety protection valve 10 is automatically opened, the gas with excessive pressure is discharged through the exhaust pipe 11, ensuring safety, and automatically shuts off after the gas with excessive pressure is discharged.

Further, an air filter 20 is connected to the air compressor 3. The air filter 20 filters impurities and dust for the air compressor 3 to ensure the normal operation of the air compressor.

The present embodiment applies the High Pressure Thermal Fluid Brake and Engine Energy Recovery System to gasoline or diesel or gas-electric hybrid vehicles, and the whole system is composed of energy collection system (ECS) and energy storage system (ESS). Multiple CES and ESS can be carried according to the structure and load of the vehicle.

Further, solenoid three-way valve 21 is connected to the air compressor 3, and the engine or battery radiator is connected through the solenoid three-way valve 21; the connection between the engine or battery radiator and the energy collection system is controlled by the solenoid three-way valve 21, and the hydrothermal fluid is introduced when the vehicle needs heat, and the heat recovery or hydrothermal reflux is carried out when the heat energy is not needed; the solenoid three-way valve 21 is connected with the control unit 19.

Specifically, the heat exchanger 301 of the air compressor 3 is respectively connected with the coolant outlet 23 of the engine (the heat source of the engine cooling system) and the radiator inlet pipe 22 of the engine (the inlet of the engine cooling system) through the solenoid three-way valve 21. The solenoid three-way valve 21 is controlled to dissipate heat (recover energy) or provide thermal energy for the engine as needed.

Embodiment 2

The difference between this embodiment and Embodiment 1 described above is that the system of Embodiment 1 is simplified without setting a solenoid three-way valve.

Figure 2:
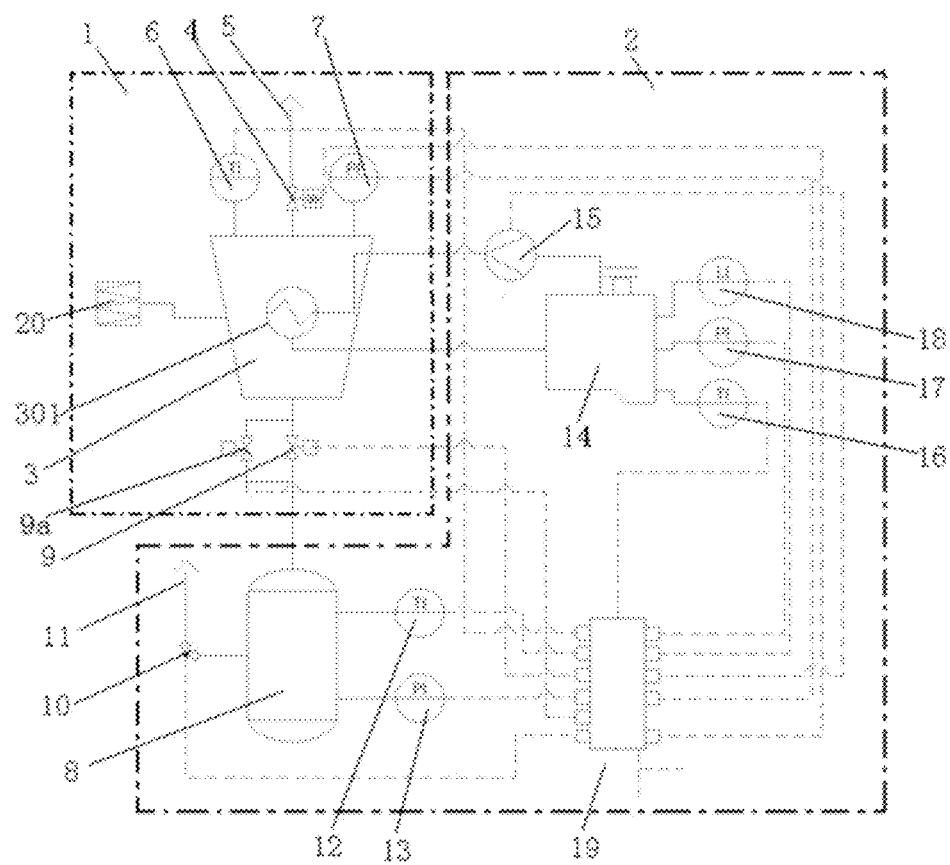
FIG. 2 is the other schematic diagram of the High Pressure Thermal Fluid Brake and Engine Energy Recovery System.

As shown in FIG. 2, the heat exchanger 301 in the air compressor 3 of the energy collection system 1 (ECS) is not connected to the heat dissipation system of the vehicle for use by vehicles that do not have thermal energy to recover, such as some electric vehicles.

However, the energy storage system 2 (ESS) is still cyclically connected with the heat exchanger 301 in the air compressor 3 of the energy collection system 1 (ECS), and can recover the heat energy generated by the air compressor itself and the heat energy brought by the high pressure gas, and release the heat energy when the vehicle or the air compressor needs the heat energy.

Embodiment 3

The present embodiment describes the principle of High Pressure Thermal Fluid Brake and Engine Energy Recovery System in Embodiment 1 or Embodiment 2.

Figure 3:
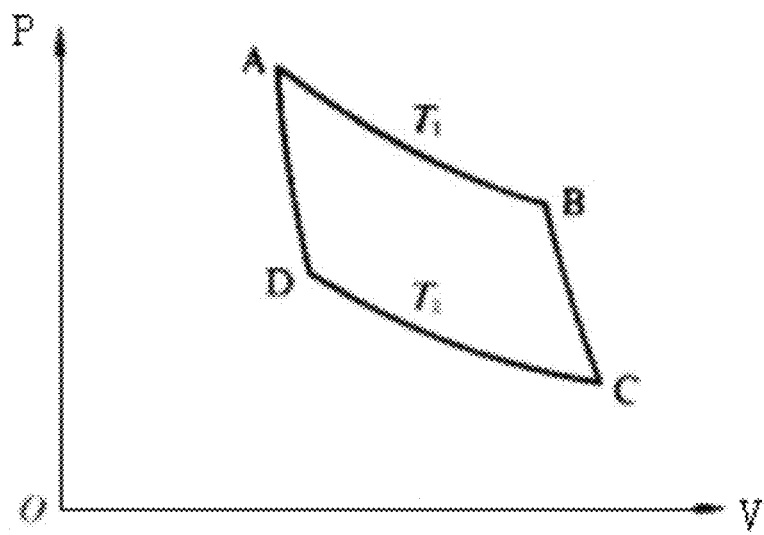
FIG. 3 is a schematic diagram of the relationship between pressure and volume change.

As shown in FIG. 3, according to the first law of thermodynamics and Carnot cycle, adiabatic compression and adiabatic expansion can store or release more energy (PD<PB) when the gas is compressed (isothermal compression: C point to D point or adiabatic compression C point to B point) or expansion (isothermal expansion A point to B point or adiabatic expansion A point to D point). When air compressor works, because a large amount of heat generated by compressed air will damage the compressor parts or reduce the life of the compressor, the radiator is usually connected to the compressor to ensure that the working temperature of the compressor is not too high. As a result, the system that uses compressed air to recover vehicle braking energy is just like the existing friction brake system, energy (thermal energy) is wasted.

The system will recover the heat dissipated from air compressor 3 into the thermal storage tank 14 to realize quasi-adiabatic compression, and when using the stored compressed gas to expand and release energy, the stored thermal energy will be injected back into the system to realize quasi-adiabatic expansion.

This system can recover the heat energy of vehicle engine, and can inject more heat energy when using compressed gas expansion than that of quasi-adiabatic compression to realize super adiabatic expansion (system release energy>system recovery energy).

In the existing technology, the brake energy recovery system is inefficient because the brake mainly depends on the friction brake system (brake pad friction brake disc), and energy recovery is only used as an auxiliary; therefore, the limited brake energy can only be proportionally distributed to the energy recovery system, and then excluding its own energy conversion waste, the energy recovery is very limited.

This system can effectively recover the heat energy of the compressor (will not cause the compressor to overheat and fail), and can flexibly adjust the gas compression pressure, so this system can completely replace the existing friction brake system (brake pad friction brake disc) to recover 100% vehicle kinetic energy and will not be wasted.

A theoretical embodiment of energy recovery calculation is as follows:

If the vehicle with a weight of 1600 KG (m) drives at a speed of 100 KM/H (v).

$$KE = \frac{1}{2}mv^2 = 0.6173 \ MJ$$

The kinetic energy of the vehicle is:

Then the work required to compress the air to brake the vehicle is equal to the kinetic energy of the vehicle.

According to thermodynamic formula, PV=nRT $$W = \int_{V1}^{V2} P(V)dV = \int_{V1}^{V2} \frac{nRT}{V}dV = nRT\ln\frac{V2}{V1}$$

Assuming that the air temperature is 20° C., R=0.287 KJ/(kg·K), V is the compressed volume of the gas, and the compressed air sets the pressure to 20 MP. When the isothermal compression heat is not recovered by the system, it is necessary to compress 1.385 KG air to 20 MP.

When all adiabatic compression heat is recovered by the system, only 0.827 KG air is compressed to 20 MP, and the system efficiency is 1.675 times higher than that of the isothermal compression system.

Assuming that the actual working efficiency of the adiabatic compression system is only 80%, the isothermal compression system can only recover 47.76% of the vehicle kinetic energy.

Further, the comparison of the above energy recovery calculation is the efficiency ratio when there is no engine thermal energy recovery (such as the system in Embodiment 2), and when there is additional engine thermal and mechanical energy recovery (the system in Embodiment 1), depending on the energy recovery time, the efficiency of the vehicle kinetic energy recovery system can be compensated (100%, 80%, 20%). If the engine thermal and mechanical energy recovery time is long enough, the system can recover more than 100% of the kinetic energy of the vehicle.

Embodiment 4

The present embodiment illustrates several energy recovery modes of the High Pressure Thermal Fluid Brake and Engine Energy Recovery System in Embodiment 1 or Embodiment 2.

Figure 4:
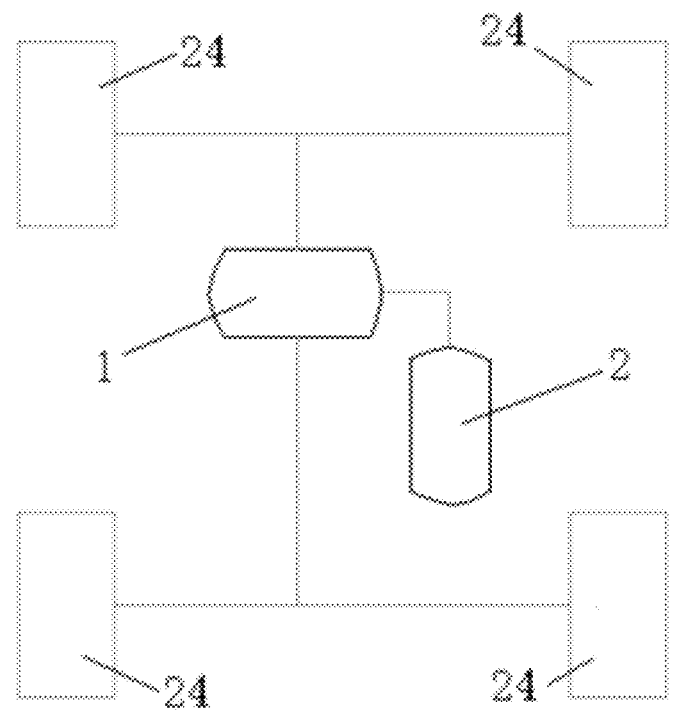
FIG. 4 is the schematic diagram of the High Pressure Thermal Fluid Brake and Engine Energy Recovery System connected with transmission.
Figure 5:
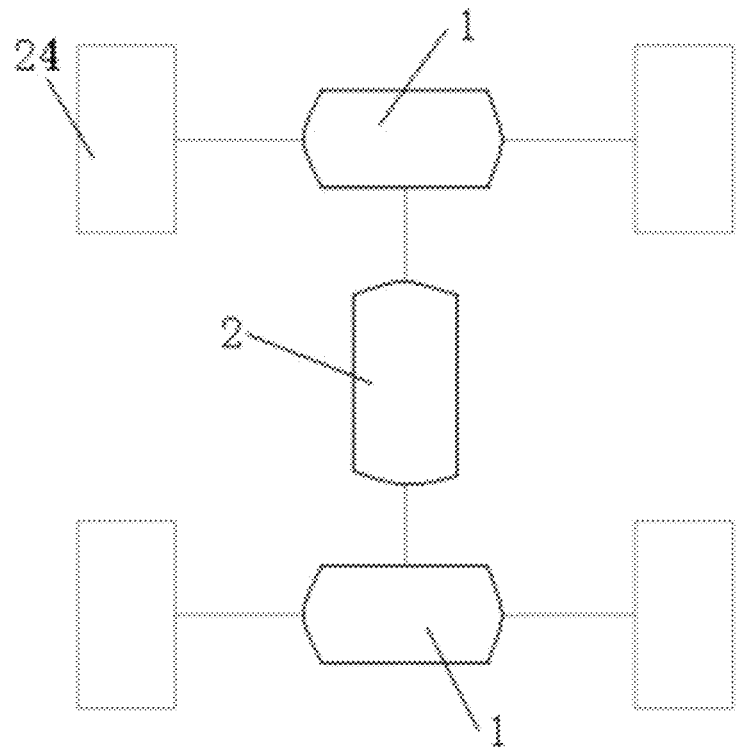
FIG. 5 is the schematic diagram of the High Pressure Thermal Fluid Brake and Engine Energy Recovery System connected with axle.
Figure 6:
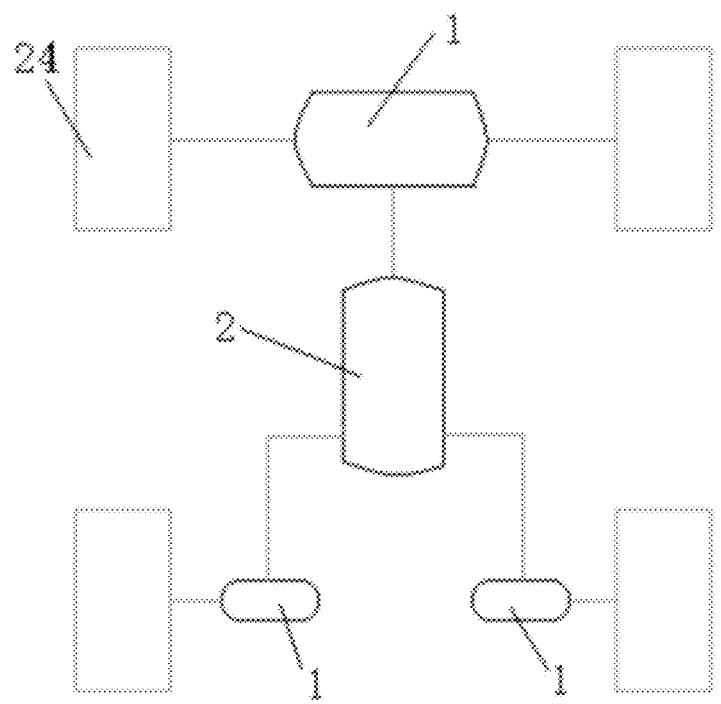
FIG. 6 is the schematic diagram of the High Pressure Thermal Fluid Brake and Engine Energy Recovery System connected with axle, wheel.

Depending on the vehicle design, the system can be connected to the transmission output or loaded directly on the wheel or axle. As shown in FIG. 4 to FIG. 6, the arrangement of the system connected to the transmission, the axle and the axle and the wheel is illustrated respectively.

When recovering the kinetic energy of the vehicle, the air is directly used as the medium, and the pressure of the compressed air is controlled to brake the vehicle. When the air is compressed, a large amount of heat will be generated at the same time. The kinetic energy of the vehicle will be converted into compressed air, mechanical energy and thermal energy will be stored and extracted and reused when needed.

Specifically, the energy collection system 1 and energy storage system 2 are connected to the drive shaft or transmission of the vehicle; the heat of the compressed high pressure gas is extracted from the gas at the air compressor 3, and the high pressure air with lowered temperature is stored in the high pressure gas storage tank 8, and the separated heat energy is stored in the thermal storage tank 14. When the brake pedal is pressed, the control system controls the braking force by collecting vehicle travel data to adjust the pressure of the first controllable regulator 9 connected to air compressor 3.

When the mechanical energy of the engine is recovered, the energy collection system 1 and the energy storage system 2 are directly connected to the engine of the vehicle through a belt or two-stage clutch, and connected to the air compressor 3 when the vehicle is at idle.

When the engine heat energy is recovered, the energy collection system 1 and energy storage system 2 are directly connected to the engine heat source of the vehicle cooling system; the engine heat energy is recovered through the heat exchanger 301 and stored in the thermal storage tank 14.

Embodiment 5

Figure 7:
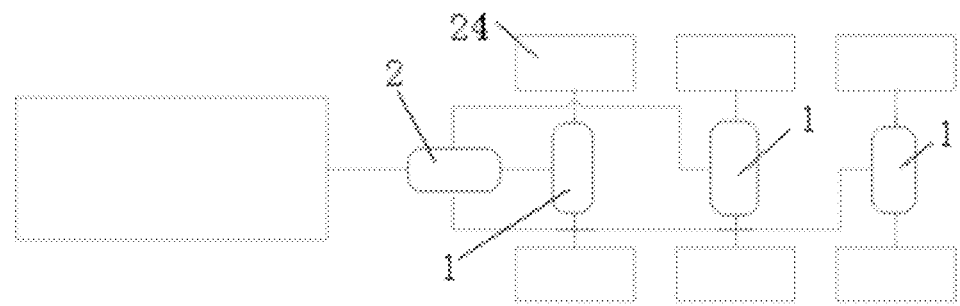
FIG. 7 is the schematic diagram of the High Pressure Thermal Fluid Brake and Engine Energy Recovery System applied to a trailer.

The system can be installed on heavy-duty truck trailer axles to recover brake energy, provide propulsion and better handling, and increase whole vehicle energy efficiency. As shown in FIG. 7, the axle of each pair of wheels 24 is respectively provided with the energy collection system 1, and a plurality of groups of the energy collection system 1 are connected in parallel with the same energy storage system 2.

Embodiment 6

This embodiment describes several energy utilization modes of High Pressure Thermal Fluid Brake and Engine Energy Recovery System in Embodiment 1 or Embodiment 2.

When providing heating for the vehicle, the thermal storage tank 14 of the energy storage system 2 is connected with the heating radiator of the vehicle.

Figure 8:
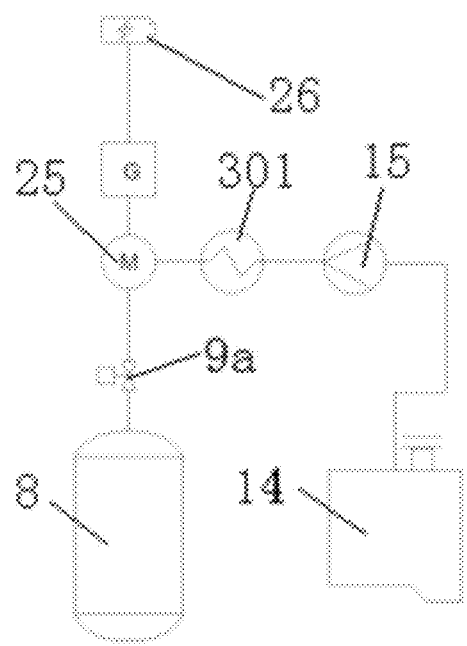
FIG. 8 is the schematic diagram of the High Pressure Thermal Fluid Brake and Engine Energy Recovery System charging vehicle battery.

When charging the vehicle battery, as shown in FIG. 8, the energy storage system 2 is connected to the generator 25 and then connected to the battery 26.

Figure 9:
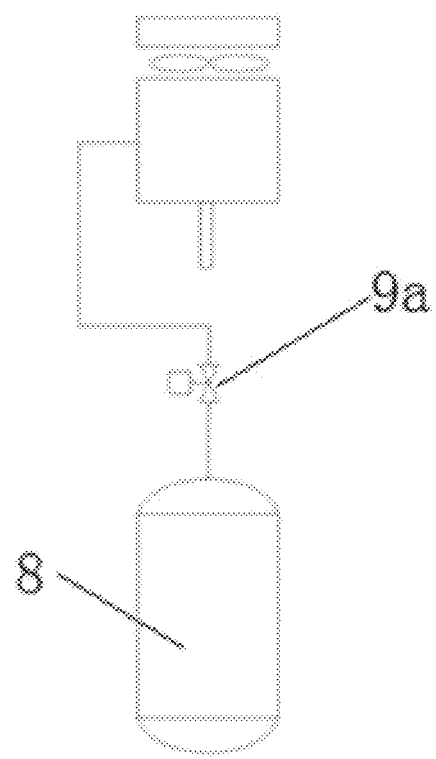
FIG. 9 is a schematic diagram of the High Pressure Thermal Fluid Brake and Engine Energy Recovery System supplying boosting air to engine.

As shown in FIG. 9, when boosting the engine turbocharger or supercharger, the high pressure gas storage tank 8 of the energy storage system 2 is equipped with the second controllable regulator 9a and connected with the vehicle engine.

When supplying air to the heavy-duty truck pneumatic brake and air suspension system, the high pressure gas storage tank 8 of the energy storage system 2 is equipped with the second controllable regulator 9a and connected with the vehicle air tanks.

The present system can effectively convert the kinetic energy of vehicle braking into thermal energy and mechanical energy to store, recover and reuse, and reversely convert the recovered energy back to vehicle to provide propulsion, heating and charging when needed. After using this system, the energy utilization rate of the vehicle is increased by 25 to 30%, reaching more than 70%, so as to achieve the purpose of energy saving, fuel saving and emission reduction. Although embodiments of the invention have been shown and described, for ordinary technical personnel in the art, it is understandable that a variety of changes, modifications, replacements, and variants can be made to these embodiments without departing from the principle and spirit of the invention, and the scope of the invention is defined by the appended claims and their equivalents.

The invention claimed is:

1. A High Pressure Thermal Fluid Brake and Engine Energy Recovery System for a vehicle, comprising:
    one or more interconnected energy collection system and energy storage system, and a control unit connected to the energy collection system and the energy storage system,
    wherein the control unit is connected to a vehicle controller to at least read and collect acceleration pedal position information, brake pedal position information, vehicle travel parameters and cooling system parameters of the vehicle,
    wherein the energy collection system recovers vehicle kinetic energy, engine mechanical energy and engine thermal energy and stores the recovered energy in the energy storage system,
    wherein the control unit controls the energy recovery process and controls the reuse of the energy collected by the energy storage system according to vehicle operation status, and
    wherein the high pressure thermal fluid brake and engine energy recovery system is configured to perform an energy recovery method comprising:
    separating, via the energy collection system, heat of compressed high pressure gas from an air compressor;
    storing the compressed high pressure gas in a high pressure gas storage tank in the energy storage system;
    storing the extracted heat in a thermal storage tank in the energy storage system;
    feeding back acceleration pedal position information, brake pedal position information, vehicle travel parameters and cooling system parameters of the vehicle to the control unit;
    adjusting, via the control unit, a pressure setting of a controllable regulator on the air compressor; and
    connecting a pump to the thermal storage tank according to the need of energy recovery or propulsion.

2. The High Pressure Thermal Fluid Brake and Engine Energy Recovery System according to claim 1, wherein:
    the energy collection system comprises the air compressor with a heat exchanger, a solenoid on/off valve, a first temperature sensor, and a first pressure sensor,
    the energy storage system includes the high pressure gas storage tank and the thermal storage tank,
    the high pressure gas storage tank is connected to the air compressor through a pipe and a few check valves and controllable regulators,
    the thermal storage tank is connected to the air compressor heat exchanger through a circulating pipeline and the pump,
    a second temperature sensor and a second pressure sensor are installed on the high pressure gas storage tank, and a third temperature sensor, a third pressure sensor, and a liquid level sensor are installed on the thermal storage tank,
    the air compressor is also connected to an engine or a battery radiator through a solenoid three-way valve, and
    the solenoid on/off valve, the first temperature sensor, the first pressure sensor, the controllable regulator, the second temperature sensor, the second pressure sensor, the third temperature sensor, the third pressure sensor, the liquid level sensor, and the solenoid three-way valve is connected and or controlled by the control unit.

3. The High Pressure Thermal Fluid Brake and Engine Energy Recovery System according to claim 2, wherein the air compressor has a bypass on an air inlet thereof, and the solenoid on/off valve controls the opening and closing of the air inlet of the air compressor.

4. High Pressure Thermal Fluid Brake and Engine Energy Recovery System according to claim 2, wherein the high pressure gas storage tank is also provided with an exhaust pipe, an overpressure safety protection valve is installed on the exhaust pipe, and the overpressure safety protection valve is connected to the control unit.

5. The High Pressure Thermal Fluid Brake and Engine Energy Recovery System according to claim 2, wherein an air filter is connected to the air compressor.

6. The High Pressure Thermal Fluid Brake and Engine Energy Recovery System according to claim 2, wherein the heat exchanger of the air compressor is respectively connected to a coolant outlet of the engine and a coolant inlet of a radiator of the engine through the solenoid three-way valve.

7. The High Pressure Thermal Fluid Brake and Engine Energy Recovery System according to claim 1, wherein the energy collection system and the energy storage system are connected to a driveshaft or transmission of the vehicle when recovering the kinetic energy of the vehicle; the energy collection system and the energy storage system are directly connected to the engine of the vehicle through a belt or a two-stage clutch when recovering the mechanical energy of the engine; the energy collection system and energy storage system are directly connected to the engine heat source of the vehicle cooling system when recovering the engine heat energy.

8. The High Pressure Thermal Fluid Brake and Engine Energy Recovery System according to claim 1, wherein the energy collection system is connected to each of a plurality of vehicle axles; and multiple energy collection systems are connected to one energy storage system.

9. The High Pressure Thermal Fluid Brake and Engine Energy Recovery System according to claim 1, wherein the application of the reuse of the energy collected other than propulsion provide heating to the cabin by connecting the thermal storage system to the cabin heat exchanger; provide high pressure air to air suspension and air brakes by connecting the high pressure gas storage tank to vehicle air tanks through a regulator; provide high pressure air to a supercharger or turbocharger by connecting the high pressure gas storage tank to engine air intake through a regulator; and/or provide charging power to an electric vehicle battery by connecting the high pressure gas storage tank and the thermal storage system to a generator through an air motor.

\* \* \* \* \*